United States Patent
Park

(10) Patent No.: US 8,791,935 B2
(45) Date of Patent: Jul. 29, 2014

(54) DC-DC CONVERTER, ORGANIC ELECTROLUMINESCENT DISPLAY DEVICE INCLUDING THE SAME, AND METHOD OF DRIVING THE ORGANIC ELECTROLUMINESCENT DISPLAY DEVICE

(75) Inventor: Sung Cheon Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 730 days.

(21) Appl. No.: 13/005,974

(22) Filed: Jan. 13, 2011

(65) Prior Publication Data

US 2011/0273422 A1 Nov. 10, 2011

(30) Foreign Application Priority Data

May 6, 2010 (KR) .................. 10-2010-0042583

(51) Int. Cl.
G09G 5/00 (2006.01)
(52) U.S. Cl.
USPC ........... 345/211; 345/204; 345/205; 345/207; 345/212
(58) Field of Classification Search
CPC .......... G09G 3/3233; G09G 2320/041; G09G 2330/12; G09G 2330/028; G09G 2330/012
USPC ............ 345/76–102, 204–212; 323/259–282; 315/291–295; 320/106–108, 116–128, 320/141
See application file for complete search history.

(56) References Cited

U.S. PATENT DOCUMENTS

| | | | | |
|---|---|---|---|---|
| 5,659,237 A | * | 8/1997 | Divan et al. ................ | 320/119 |
| 6,051,940 A | * | 4/2000 | Arun ........................... | 315/307 |
| 7,274,175 B2 | * | 9/2007 | Manolescu ................... | 323/267 |
| 7,750,600 B2 | * | 7/2010 | Stanzel et al. ............... | 320/116 |
| 8,138,720 B2 | * | 3/2012 | Snyder et al. ............... | 320/127 |
| 8,364,287 B2 | * | 1/2013 | Pearson et al. .............. | 700/11 |
| 8,368,312 B2 | * | 2/2013 | Kim et al. .................. | 315/185 R |
| 2002/0015033 A1 | | 2/2002 | Kim | |
| 2004/0041548 A1 | * | 3/2004 | Perry ........................... | 323/282 |
| 2004/0100149 A1 | * | 5/2004 | Lai .............................. | 307/82 |
| 2004/0125065 A1 | * | 7/2004 | Park et al. .................. | 345/92 |
| 2005/0258772 A1 | * | 11/2005 | Park et al. .................. | 315/169.1 |
| 2006/0033473 A1 | * | 2/2006 | Stanzel et al. ............... | 320/128 |
| 2006/0033476 A1 | * | 2/2006 | Reynolds et al. ............ | 320/141 |

(Continued)

FOREIGN PATENT DOCUMENTS

| JP | 2004-266674 | 9/2004 |
|---|---|---|
| JP | 3748262 | 12/2005 |

(Continued)

OTHER PUBLICATIONS

KIPO Registration Determination Certificate dated Nov. 18, 2011, for Korean Patent application 10-2010-0042584, noting listed references in this IDS, 5 pages.

(Continued)

*Primary Examiner* — Prabodh M Dharia

(74) *Attorney, Agent, or Firm* — Christie, Parker & Hale, LLP

(57) ABSTRACT

A direct current (DC)-DC converter for preventing ignition and destruction of an organic electroluminescent display device by not driving the current when a parameter of the organic electroluminescent display device is abnormal, an organic electroluminescent display device including the DC-DC converter, and a method of driving the organic electroluminescent display device.

18 Claims, 8 Drawing Sheets

(56) References Cited

U.S. PATENT DOCUMENTS

| | | | |
|---|---|---|---|
| 2006/0290332 A1* | 12/2006 | Condito | 323/272 |
| 2007/0030716 A1* | 2/2007 | Manolescu | 363/84 |
| 2007/0146477 A1* | 6/2007 | Lee | 348/14.01 |
| 2007/0279376 A1* | 12/2007 | Park | 345/102 |
| 2008/0007544 A1* | 1/2008 | Huang et al. | 345/211 |
| 2008/0209286 A1* | 8/2008 | Hamada | 714/724 |
| 2008/0246702 A1* | 10/2008 | Lee et al. | 345/77 |
| 2009/0039711 A1* | 2/2009 | Williams | 307/113 |
| 2009/0102417 A1* | 4/2009 | Stanzel et al. | 320/106 |
| 2010/0033467 A1* | 2/2010 | Park | 345/211 |
| 2010/0201720 A1* | 8/2010 | Zampini et al. | 345/690 |
| 2010/0202159 A1* | 8/2010 | Sims et al. | 363/15 |
| 2011/0018518 A1* | 1/2011 | Peron | 323/299 |
| 2011/0115777 A1* | 5/2011 | Park | 345/212 |
| 2011/0156676 A1* | 6/2011 | Zhu et al. | 323/282 |
| 2011/0199046 A1* | 8/2011 | Tsai et al. | 320/108 |
| 2011/0304597 A1* | 12/2011 | Hyatt | 345/207 |

FOREIGN PATENT DOCUMENTS

| | | |
|---|---|---|
| JP | 2006-340587 | 12/2006 |
| KR | 10-0348275 B1 | 8/2002 |
| KR | 10-2004-0061488 | 7/2004 |
| KR | 10-2007-0063737 | 6/2007 |
| KR | 10-2007-0099800 | 10/2007 |
| KR | 10-2008-0062774 | 7/2008 |
| KR | 10-2008-0082047 | 9/2008 |
| KR | 10-2008-0090879 | 10/2008 |
| KR | 10-2008-0095024 | 10/2008 |
| KR | 10-2009-0095135 | 9/2009 |

OTHER PUBLICATIONS

U.S. Appl. No. 12/984,943, filed Jan. 5, 2011, Sung Cheon Park, Samsung Mobile Display Co., Ltd.

KIPO Registration Determination Certificate dated Apr. 18, 2012, for Korean priority Patent application 10-2010-0042583, (5 pages).

* cited by examiner

DC-DC CONVERTER, ORGANIC ELECTROLUMINESCENT DISPLAY DEVICE INCLUDING THE SAME, AND METHOD OF DRIVING THE ORGANIC ELECTROLUMINESCENT DISPLAY DEVICE

CROSS-REFERENCE TO RELATED APPLICATION

This application claims the benefit of Korean Patent Application No. 10-2010-0042583, filed May 6, 2010, in the Korean Intellectual Property Office, the disclosure of which is incorporated herein in its entirety by reference.

BACKGROUND

1. Field

An aspect of the present invention relates to a direct current (DC)-DC converter, an organic electroluminescent display device including the same, and a method of driving the electroluminescent display device.

2. Description of the Related Art

Various flat panel display devices have recently been developed to overcome the disadvantages of cathode ray tubes which are heavy and large. Examples of flat panel display devices include liquid crystal display devices, field emission display devices, plasma display panels, and organic electroluminescent display devices.

Among flat panel display devices, organic electroluminescent display devices display images by using organic light emitting diodes (OLEDs) that emit light due to recombination between electrons and holes.

Organic electroluminescent display devices are increasingly being used in various devices such as televisions, mobile phones, personal digital assistants (PDAs), MPEG audio layer-3 (MP3) players, and digital cameras because they have good color reproduction and small thickness.

SUMMARY

An aspect of the present invention provides a direct current (DC)-DC converter for preventing ignition and destruction by not driving when an organic electroluminescent display device is abnormal, an organic electroluminescent display device including the DC-DC converter, and a method of driving the organic electroluminescent display device.

According to an aspect of the present invention, there is provided an organic electroluminescent display device including: a pixel unit including a plurality of scan lines arranged in a row direction, a plurality of data lines arranged in a column direction, and a plurality of pixels formed at intersections between the plurality of scan lines and the plurality of data lines; a power supply unit to generate and output a DC power supply from an external power source; and a DC-DC converter to receive the DC power supply from the power supply unit, to generate a first power supply voltage and a second power supply voltage, and to supply the first power supply voltage and the second power supply voltage to the pixel unit, wherein the DC-DC converter includes: a boost converter to receive the DC power supply from the power supply unit and to generate the first power supply voltage; a buck-boost converter to receive the DC power supply from the power supply unit and to generate the second power supply voltage; and an output control unit to measure a temperature of the DC-DC converter, to compare the temperature with a reference temperature, to stop output of the first power supply voltage of the boost converter and the second power supply voltage of the buck-boost converter if the temperature is equal to or greater than the reference temperature, and to maintain a state where the output is stopped.

The boost converter may include a first switching element to form an electrical path between a DC power supply source of the power supply unit and a ground voltage source, and a second switching element to form an electrical path between the DC power supply source of the power supply unit and a first power supply voltage output terminal, and the buck-boost converter may include a third switching element to form an electrical path between the DC power supply source of the power supply unit and the ground voltage source and a fourth switching element to form an electrical path between the DC power supply source of the power supply unit and a second power supply voltage output terminal.

The output control unit may include a switching controller to control the first switching element through the fourth switching element to be turned on or off.

The output control unit may include a temperature controller to measure a temperature of the DC-DC converter, to compare the temperature of the DC-DC converter with a reference temperature, and to output a signal to the switching controller if the temperature of the DC-DC converter is equal to or greater than the reference temperature.

The output control unit may maintain the state where the output of the first power supply voltage and the second power supply voltage is stopped until the DC-DC converter is reset.

The boost converter or the buck-boost converter may further include an inductor to transmit the DC power supply of the power supply unit to the first power supply voltage output terminal or the second power supply voltage output terminal.

The organic electroluminescent display device may further include a current comparing unit to compare an induced current output from the inductor with an allowable current, and to output a current detection signal to the output control unit if the induced current is equal to or greater than the allowable current, wherein the output control unit stops the output of the first power supply voltage and the second power supply voltage according to the current detection signal.

The output control unit may maintain the state where the output of the first power supply voltage and the second power supply voltage is stopped until the DC-DC converter is reset.

The boost converter may further include a first capacitor having a first terminal electrically connected to the first power supply voltage output terminal and a second terminal electrically connected to the ground voltage source.

The buck-boost converter may further include a second capacitor having a first terminal electrically connected to the second power supply voltage output terminal and a second terminal electrically connected to the ground voltage source.

According to another aspect of the present invention, there is provided a DC-DC converter including: a boost converter to receive a DC power supply from a power supply unit and to generate a first power supply voltage; a buck-boost converter to receive the DC power supply from the power supply unit and to generate a second power supply voltage; and an output control unit to measure a temperature of the DC-DC converter, to compare the temperature with a reference temperature, to stop an output of the first power supply voltage of the boost converter and the second power supply voltage of the buck-boost converter if the temperature is equal to or greater than the reference temperature, and to maintain a state where the output is stopped.

The boost converter may include a first switching element to form an electrical path between a DC power supply source of the power supply unit and a ground voltage source and a second switching element to form an electrical path between the DC power supply source of the power supply unit and a first power supply voltage output terminal, and the buck-boost converter may include a third switching element to form an electrical path between the DC power supply source of the power supply unit and the ground voltage source and a fourth switching unit to form an electrical path between the DC power supply source of the power supply unit and a second power supply voltage output terminal.

The output control unit may include a switching controller to control the first switching unit through the fourth switching unit to be turned on or off.

The output control unit may include a temperature controller to measure a temperature of the DC-DC converter, to compare the temperature of the DC-DC converter with a reference temperature, and to output a signal to the switching controller if the temperature of the DC-Dc converter is equal to or greater than the reference temperature.

The output control unit may maintain the state where the output of the first power supply voltage and the second power supply voltage is stopped until the DC-DC converter is reset.

The boost converter or the buck-boost converter may further include an inductor to transmit the DC power supply of the power supply unit to the first power supply voltage output terminal or the second power supply voltage output terminal.

The DC-DC converter may further include a current comparing unit to compare an induced current output from the inductor with an allowable current and to output a current detection signal to the output control unit if the induced current is equal to or greater than the allowable current, wherein the output control unit stops the output of the first power supply voltage and the second power supply voltage according to the current detection signal.

The output control unit may maintain the state where the output of the first power supply voltage and the second power supply voltage is stopped until the DC-DC converter is reset.

The boost converter may further include a first capacitor having a first terminal electrically connected to the first power supply voltage output terminal and a second terminal electrically connected to the ground voltage source.

The buck-boost converter may further include a second capacitor having a first terminal electrically connected to the second power supply voltage output terminal and a second terminal electrically connected to the ground voltage source.

According to another aspect of the present invention, there is provided a method of driving an organic electroluminescent display device including a power supply unit to generate a DC power supply from an external power source and to supply the DC power supply to a DC-DC converter and the DC-DC converter to convert the DC power supply into a first power supply voltage and a second power supply voltage and to supply the first power supply voltage and the second power supply voltage to a plurality of pixels, the method including: receiving the DC power supply from the power supply unit and generating the first power supply voltage and the second power supply voltage; detecting a temperature of the DC-DC converter; comparing the temperature with a reference temperature; stopping output of the first power supply voltage and the second power supply voltage if the temperature is equal to or greater than the reference temperature; and maintaining a state where the output of the first power supply voltage and the second power supply voltage is stopped until the DC-DC converter is reset.

The method may further include: detecting a current in a path through which the DC power supply of the DC-DC converter is transmitted; comparing the current with an allowable current; outputting a current detection signal if the current is equal to or greater than the allowable current; and stopping the output of the first power supply voltage and the second power supply voltage according to the current detection signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
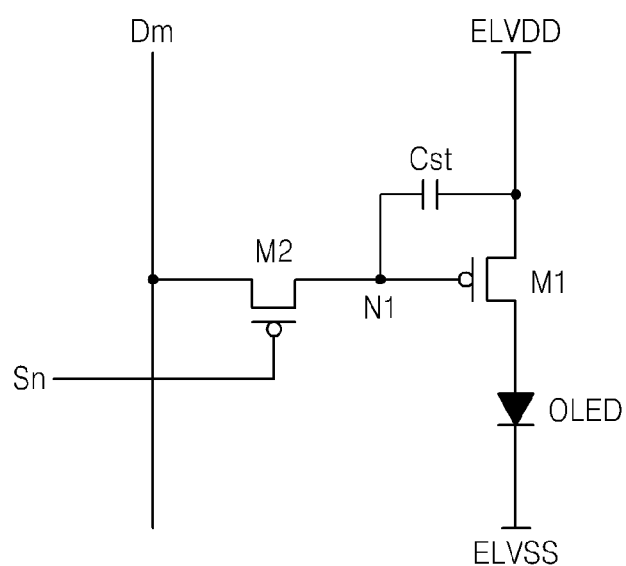
FIG. 1 is a circuit diagram illustrating a structure of a pixel included in an organic electroluminescent display device, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

While such terms as "first," "second," etc., may be used to describe various components, such components must not be limited to the above terms. The above terms are used only to distinguish one component from another.

The terms used in the present specification are merely used to describe particular embodiments, and are not intended to limit the aspects of the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The aspects of the present invention may be described in terms of functional block components and various processing steps. Such functional blocks may be realized by any number of hardware and/or software components configured to perform the specified functions. For example, the aspects of the present invention may employ various integrated circuit components, e.g., memory elements, processing elements, logic elements, look-up tables, and the like, which may carry out a variety of functions under the control of one or more microprocessors or other control devices. Similarly, where the elements of the aspects of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the present invention could employ any number of conventional techniques for electronics configuration, signal processing and/or control, data processing and the like. The words mechanism, element, means, and configuration are used broadly and are not limited to mechanical or physical embodiments, but can include software routines in conjunction with processors, etc.

The embodiments of the present invention will be described below in more detail with reference to the accompanying drawings. Those components that are the same or are in correspondence are rendered the same reference numeral regardless of the figure number, and redundant explanations are omitted.

Although an organic electroluminescent display device is explained, the aspects of the present invention are not limited thereto. That is, the technical scope of the aspects of the present invention may encompass various flat panel display devices.

FIG. 1 is a circuit diagram illustrating a structure of a pixel included in an organic electroluminescent display device, according to an embodiment of the present invention.

Referring to FIG. 1, the pixel includes a pixel circuit including a first transistor M1, a second transistor M2, and a storage capacitor Cst, and an organic light-emitting diode (OLED).

The first transistor M1 has a source electrode to which a first power supply voltage ELVDD is transmitted, a drain electrode connected to the OLED, and a gate electrode connected to a first node N1. The second transistor M2 has a source electrode connected to a data line Dm, a drain electrode connected to the first node N1, and a gate electrode connected to a scan line Sn. The storage capacitor Cst has a first electrode to which the first power supply voltage ELVDD is transmitted and a second electrode connected to the first node N1. The OLED includes an anode, a cathode, and a light-emitting layer, and the anode is connected to the drain electrode of the first transistor M1 and a second power supply voltage ELVSS is transmitted to the cathode. When current flows from the anode to the cathode of the OLED, the light-emitting layer emits light according to the amount of the current flowing from the anode to the cathode. Equation 1 shows current flowing through the drain electrode of the first transistor M1.

$$I_d = \frac{\beta}{2}(ELVDD - Vdata - Vth)^2 \quad \text{[Equation 1]}$$

where $I_d$ is the current flowing through the drain electrode of the first transistor M1, Vdata is a voltage of a data signal, ELVDD is the first power supply voltage transmitted to the source electrode of the first transistor M1, Vth is a threshold voltage of the first transistor M1, and β is a constant.

Figure 2:
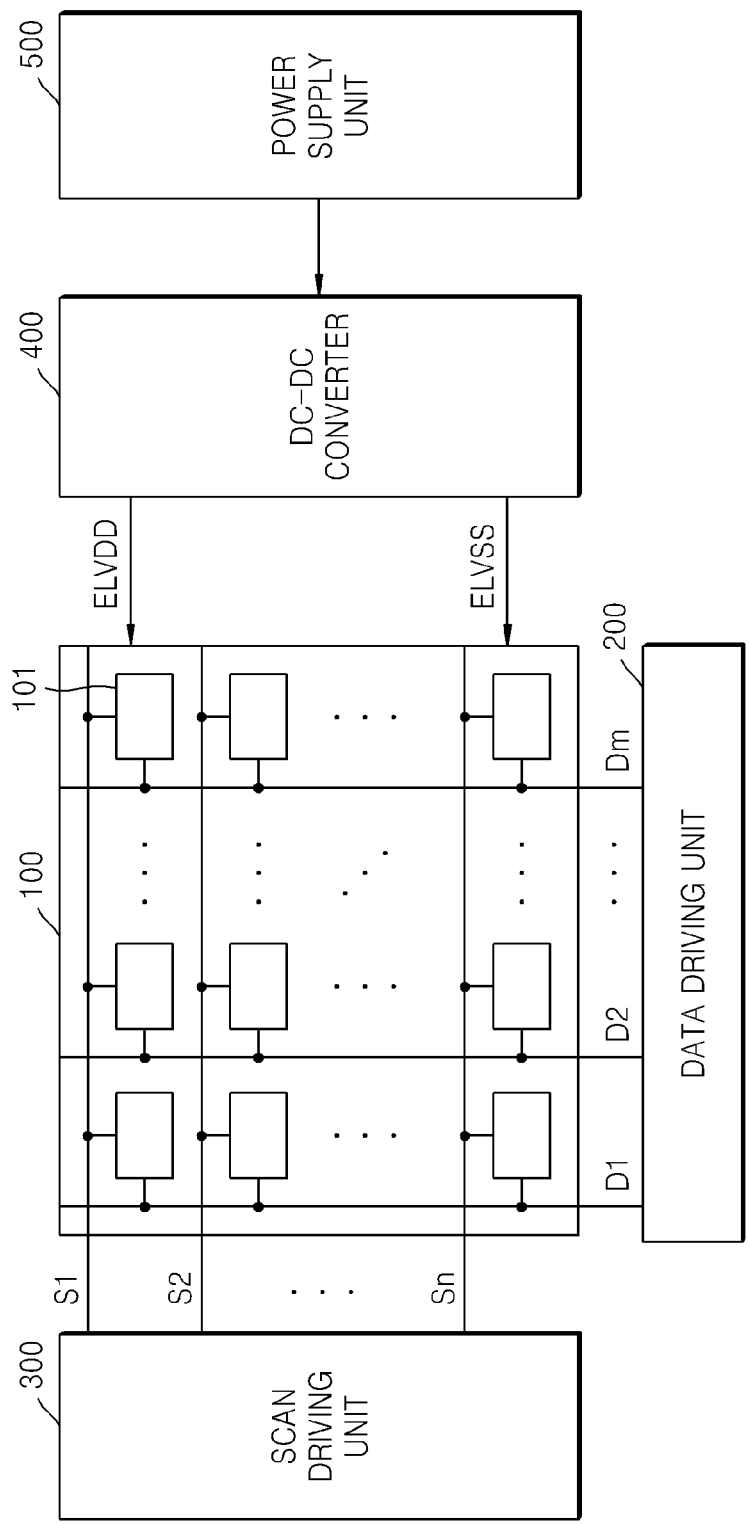
FIG. 2 is a block diagram of an organic electroluminescent display device according to an embodiment of the present invention.

FIG. 2 is a block diagram of an organic electroluminescent display device according to an embodiment of the present invention. Referring to FIG. 2, the organic electroluminescent display device includes a pixel unit 100, a data driving unit 200, a scan driving unit 300, and a direct current (DC)-DC converter 400.

The pixel unit 100 includes a plurality of pixels 101 each of which includes an OLED for emitting light according to a flow of current. In the pixel unit 100, n scan lines S1, S2, ... Sn-1, Sn for transmitting scan signals are formed in a row direction, and m data lines D1, D2, ... Dm-1, Dm for transmitting data signals are formed in a column direction. Each of the pixels 101 receives from the DC-DC converter 400 power supply voltages, that is, a first power supply voltage ELVDD and a second power supply voltage ELVSS and drives the OLED by using the first and second power supply voltages ELVDD and ELVSS. Accordingly, the pixel unit 100 receives the scan signals, the data signals, the first power supply voltage ELVDD, and the second power supply voltage ELVSS and makes the OLEDs emit light, thereby displaying images.

The data driving unit 200 for respectively applying data signals to the pixels 101 receives video data, for example, red, green, and blue (RGB) data, and generates data signals. The data driving unit 200 is connected to the data lines D1, D2, ... Dm-1, Dm of the pixel unit 100 and respectively applies the data signals to the pixels 101.

The scan driving unit 300 for respectively applying scan signals to the pixels 101 is connected to the scan lines S1, S2, ... Sn-1, Sn and respectively transmits the scan signals to the pixels 101. The data signals output from the data driving unit 200 are transmitted to the pixels 101 to which the scan signals are transmitted, so that driving currents are generated in pixel circuits and the driving current flow to the OLEDs.

The DC-DC converter 400 receives a predetermined DC power supply from a power supply unit 500, changes a voltage level, generates a first power supply voltage ELVDD and a second power supply voltage ELVSS suitable for the pixel unit 100, and transmits the first power supply voltage ELVDD and the second power supply voltage ELVSS to the pixel unit 100. The first power supply voltage ELVDD is transmitted to a first power supply voltage line of the pixels 101, and the second power supply voltage ELVSS is transmitted to a second power supply voltage line of the pixels 101.

The power supply unit 500 generates a DC power supply from an external power source and applies the DC power supply to the DC-DC converter 400.

Figure 3:
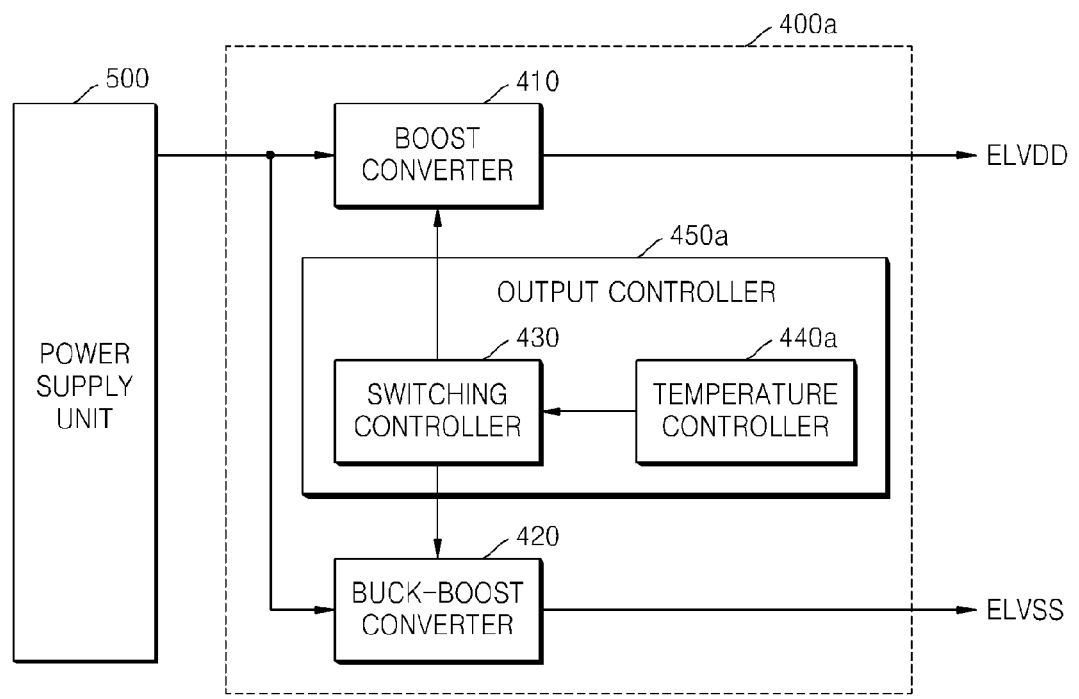
FIG. 3 is a block diagram of a direct current (DC)-DC converter of the organic electroluminescent display device of FIG. 2, according to an embodiment of the present invention.

FIG. 3 is a block diagram of the DC-DC converter 400 of the organic electroluminescent display device of FIG. 2, according to an embodiment of the present invention.

Referring to FIG. 3, the DC-DC converter 400 may be a DC-DC converter 400a that includes a boost converter 410, a buck-boost converter 420, and an output control unit or output controller 450a including a switching controller 430 and a temperature controller 440a.

The power supply unit 500 supplies a DC power supply to the DC-DC converter 400a.

The boost converter 410 receives the DC power supply from the power supply unit 500 and generates the first power supply voltage ELVDD. The first power supply voltage ELVDD is a positive power supply voltage necessary to drive each of pixels 101. The first power supply voltage ELVDD generated by the boost converter 410 is applied to the pixel unit 100 through the first power supply voltage line.

The buck-boost converter 420 receives the DC power supply from the power supply unit 500 and generates the second power supply voltage ELVSS. The second power supply voltage ELVSS is a negative power supply voltage necessary to drive each of the pixels 101. The second power supply voltage ELVSS generated by the buck-boost converter 420 is applied to the pixel unit 100 through the second power supply voltage line.

The output control unit or output controller 450a measures a temperature of the DC-DC converter 400a, compares the temperature with a reference temperature, stops output of the first power supply voltage ELVDD of the boost converter 410 and the second power supply voltage ELVSS of the buck-boost converter 420 if the temperature is equal to or greater than the reference temperature, and maintains a state where the output is stopped.

Figure 4:
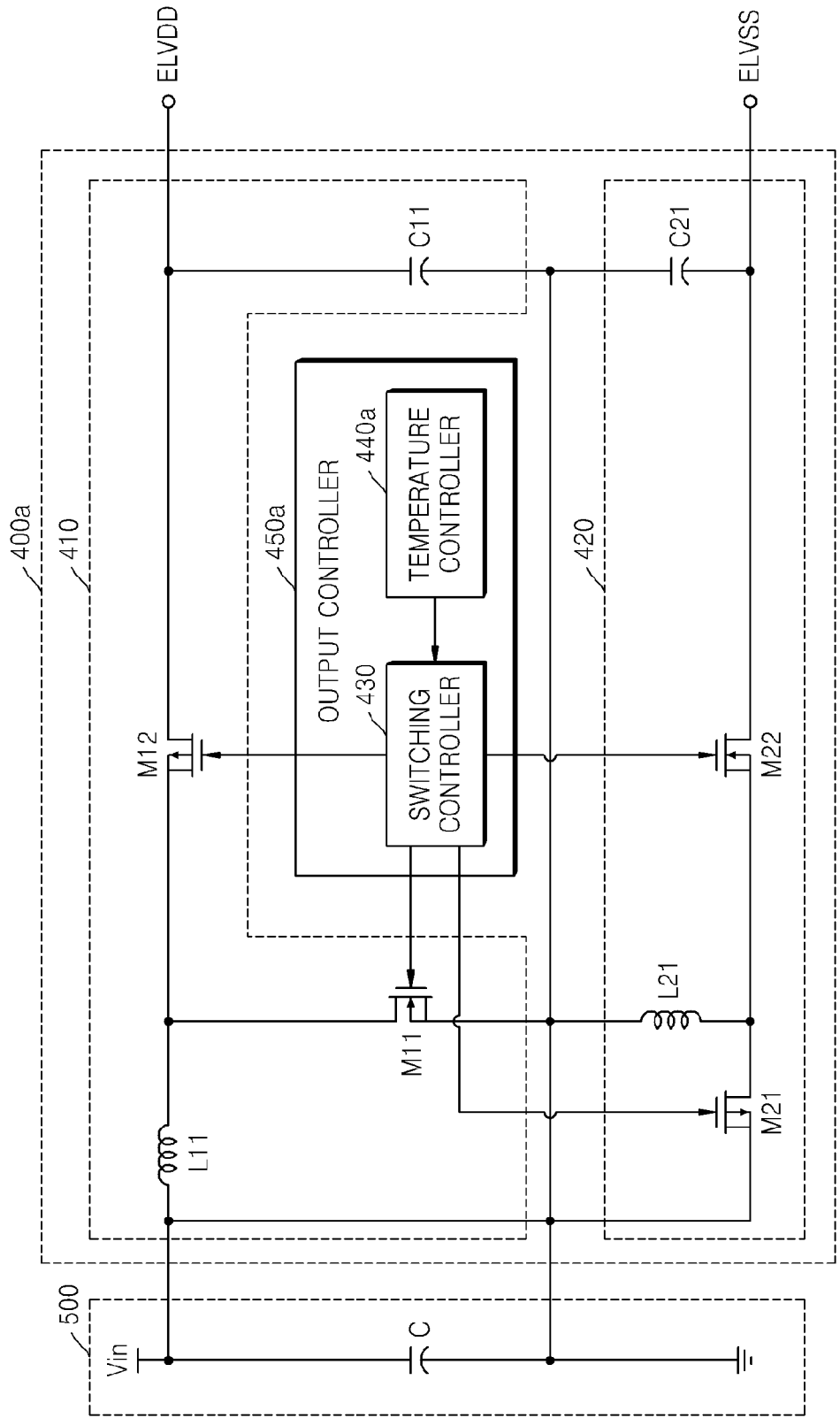
FIG. 4 is a circuit diagram of the DC-DC converter illustrated in FIG. 3.

The output control unit or output controller 450a may control the boost converter 410 and the buck-boost converter 420 to output the first power supply voltage ELVDD and the second power supply voltage ELVSS when the DC-DC converter 400a is normal, and to stop the output of the first power supply voltage ELVDD and the second power supply voltage ELVSS when the DC-DC converter 400a is abnormal. The output control unit or output controller 450a of FIG. 3 may include the switching controller 430 and the temperature controller 440a FIG. 4 is a circuit diagram of the DC-DC converter 400a illustrated in FIG. 3. The power supply unit 500 includes a capacitor C to which a DC power supply Vin is transmitted, and supplies the DC power supply Vin to the DC-DC converter 400a.

The boost converter 410 may include a first switching element M11 for forming an electrical path between a DC power supply source and a ground voltage source, and a second switching element M12 for forming an electrical path between the DC power supply source and a first power supply voltage output terminal. Also, the boost converter 410 may include a first inductor L11 to transmit the DC power supply Vin to the first power supply voltage output terminal. A first capacitor C11 included in the boost converter 410 may have a first terminal electrically connected to the first power supply voltage output terminal and a second terminal electrically connected to the ground voltage source.

Here, the first switching element M11 may be an N-channel field-effect transistor, and the second switching element M12 may be a P-channel field-effect transistor. However, the present embodiment is not limited thereto, and the first switching element M11 may be a P-channel field-effect transistor and the second switching element M12 may be an N-channel field-effect transistor. When the DC-DC converter 400a is normal, if the first switching element M11 is turned on, the second switching element M12 may be turned off, and if the first switching element M11 is turned off, the second switching element M12 may be turned on. When the DC-DC converter 400a is abnormal, both the first switching element M11 and the second switching element M12 may be turned off.

The first power supply voltage ELVDD is output from the boost converter 410 and applied to the pixel unit 100 through the first power supply voltage line.

The buck-boost converter 420 may include a third switching element M21 for forming an electrical path between the DC power supply source and the ground voltage source, and a fourth switching element M22 for forming an electrical path between the DC power supply source and a second power supply voltage output terminal. Also, the buck-boost converter 420 may include a second inductor L21 to transmit the DC power supply Vin to the second power supply voltage output terminal. A second capacitor C21 included in the buck-boost converter 420 may have a first terminal electrically connected to the second power supply voltage output terminal and a second terminal electrically connected to the ground voltage source.

Here, the third switching element M21 may be a P-channel field-effect transistor and the fourth switching element M22 may be an N-channel field-effect transistor. However, the present embodiment is not limited thereto, and the third switching element M21 may be an N-channel field-effect transistor and the fourth switching element M22 may be a P-channel field-effect transistor. When the DC-DC converter 400a is normal, if the third switching element M21 is turned on, the fourth switching element M22 may be turned off, and if the third switching element M21 is turned off, the fourth switching element M22 may be turned on. When the DC-DC converter 400a is abnormal, both the third switching element M21 and the fourth switching element M22 may be turned off.

The second power supply voltage ELVSS is output from the buck-boost converter 420, and is applied to the pixel unit 100 through the second power supply voltage line.

When the DC-DC converter 400a is normal, if the first switching element M11 of the boost converter 410 is turned on, the fourth switching element M22 of the buck-boost converter 420 is turned on, and if the second switching element M12 of the boost converter 410 is turned on, the third switching element M21 of the buck-boost converter 420 is turned on.

The temperature controller 440a measures a temperature of the DC-DC converter 400a, and compares the temperature of the DC-DC converter 400a with a reference temperature. If the measured temperature of the DC-DC converter is equal to or greater than the reference temperature, the temperature controller 440a outputs a signal to the switching controller 430. Here, the reference temperature may vary according to the type, size, elements, etc. of the organic electroluminescent display device, or may be a value determined during manufacturing. For example, the temperature controller 440a may output a signal to the switching controller 430 if a temperature measured by a thermometer installed at a specific position of the DC-DC converter 400a is equal to or greater than 140° C.

The switching controller 430 controls the first switching element M11 and the second switching element M12 of the boost converter 410. Also, the switching controller 430 controls the third switching element M21 and the fourth switching element M22 of the buck-boost converter 420. The switching controller 430 is controlled by the signal output from the temperature controller 440a. For example, when the operation of the DC-DC converter 400a is abnormal, if the signal is received from the temperature controller 440a, the switching controller 430 may turn off all of first through fourth switching elements M11, M12, M21, and M22.

If the switching controller 430 of FIG. 4 turns off the first through fourth switching elements M11, M12, M21, and M22 due to the signal of the temperature controller 440a, a state where the first through fourth switching elements M11, M12, M21, and M22 are turned off to stop output of the first power supply voltage ELVDD and the second power supply voltage ELVSS is maintained until the DC-DC converter 400a is reset. If the state where the first through fourth switching elements M11, M12, M21, and M22 are turned off is not maintained, the temperature of the DC-DC converter 400a may be temporarily reduced and the DC-DC converter 400a may output the first power supply voltage ELVDD and the second power supply voltage ELVSS again. In this case, effects of the abnormality of the DC-DC converter 400 may intensify, thereby increasing the risk of burning the DC-DC converter 400a, and exploding or destroying the organic electroluminescent display device. Accordingly, the state where the output of the first power supply voltage ELVDD and the second power supply voltage ELVSS is stopped is maintained until the DC-DC converter 400a is reset to solve a fundamental problem.

The switching controller 430 may control the first switching element M11 and the second switching element M12 of the boost converter 410, and the third switching element M21 and the fourth switching element M22 of the buck-boost converter 420. However, the present embodiment is not limited thereto, and the switching controller 430 may include a first switching controller (not shown) for controlling the first switching element M11 and the second switching element M12 of the boost converter 410 and may be separated from a second switching controller (not shown) for controlling the third switching element M21 and the fourth switching element M22 of the buck-boost converter 420. In this case, the first switching controller and the second switching controller may receive the signal from the temperature controller 440a.

The operation of the DC-DC converter 400a when the DC-DC converter 400a is normal will now be explained. Although the boost converter 410 and the buck-boost converter 420 operate simultaneously, the operation of the boost converter 410 and the operation of the buck-boost converter 420 will be separately explained for convenience.

First, the switching controller 430 applies a high level signal to the first switching element M11 and the second switching element M12 of the boost converter 410, so that the first switching element M11 is turned on and the second switching element M12 is turned off.

Accordingly, a closed circuit is formed between the first inductor L11 and the first switching element M11 of the boost converter 410. Accordingly, the DC power supply Vin from the power supply unit 500 is introduced to the first inductor L11.

Next, the switching controller 430 applies a low level signal to the first switching element M11 and the second switching element M12 of the boost converter 410, so that the first switching element M11 is turned off and the second switching element M12 is turned on.

Accordingly, a voltage across both terminals of the first inductor L11 of the boost converter 410 is transmitted to the first capacitor C11 through the second switching element M12. Also, the second switching element M12 and the first capacitor C11 output the first power supply voltage ELVDD to the pixel unit 100.

Simultaneously, the switching controller 430 applies a low level signal to the third switching element M21 and the fourth switching element M22 of the buck-boost converter 420, so that the third switching element M21 is turned on and the fourth switching element M22 is turned off.

Accordingly, a closed circuit is formed between the third switching element M21 and the second inductor L21 of the buck-boost converter 420. Accordingly, the DC power supply Vin from the power supply unit 500 is introduced to the second inductor L21.

Next, the switching controller 430 applies a high level signal to the third switching element M21 and the fourth switching element M22 of the buck-boost converter 420, so that the third switching element M21 is turned off and the fourth switching element M22 is turned on.

Accordingly, a voltage across both terminals of the second inductor L21 of the buck-boost converter 420 is transmitted to the second capacitor C21 through the fourth switching element M22. The fourth switching element M22 and the second capacitor C21 output the second power supply voltage ELVSS to the pixel unit 100.

Figure 5:
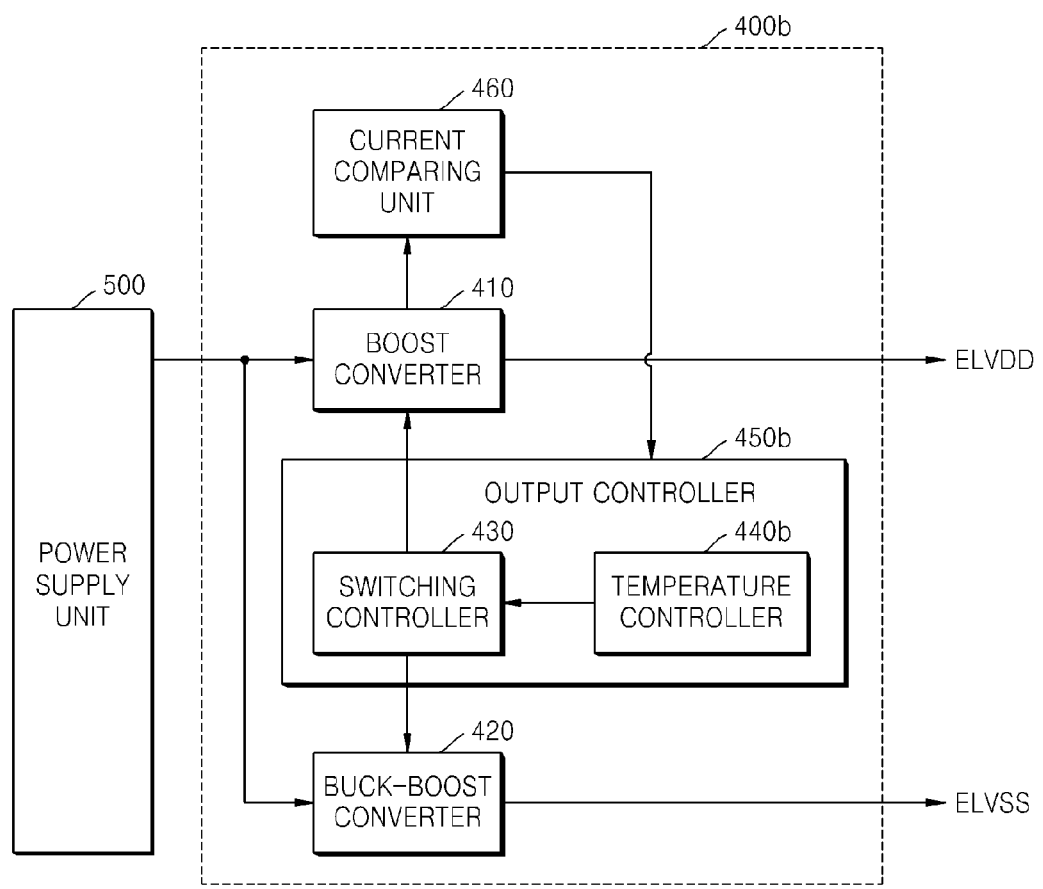
FIG. 5 is a block diagram of the DC-DC converter of the organic electroluminescent display device of FIG. 2, according to another embodiment of the present invention.

FIG. 5 is a block diagram of the DC-DC converter 400 of the organic electroluminescent display device of FIG. 2, according to another embodiment of the present invention.

The DC-DC converter 400 may be a DC-DC converter 400b illustrated in FIG. 5. The DC-DC converter 400b is different from the DC-DC converter 400a illustrated in FIG. 3 in that the DC-DC converter 400b further includes a current comparing unit 460, and includes an output control unit or output controller 450b to receive a current detection signal from the current comparing unit 460. The structures and operations of the boost converter 410, the buck-boost converter 420, the switching controller 430, and a temperature controller 440b are the same as those described with reference to FIG. 3 and thus a detailed explanation thereof will not be given.

The current comparing unit 460 compares an induced current output from the first inductor L11 included in the boost converter 410 or an induced current output from the second inductor L21 included in the buck-boost converter 420 with an allowable current. The current comparing unit 460 outputs a current detection signal to the output control unit or output controller 450b if the induced current is greater than the allowable current. For example, if a short-circuit occurs between a first power supply voltage source and a second power supply voltage source, the induced current is rapidly increased to a level above the allowable current. In this case, the current comparing unit 460 outputs the current detection signal to the output control unit or output controller 450b.

Like the temperature controller 440a illustrated in FIG. 3, the temperature controller 440b illustrated in FIG. 5 measures a temperature of the DC-DC converter 400b, compares the temperature with a reference temperature, and outputs a signal to the switching controller 430 if the temperature is equal to or greater than the reference temperature. The switching controller 430 stops output of the first power supply voltage ELVDD and the second power supply voltage ELVSS by turning off the first through fourth switching elements M11, M12, M21, and M22.

If a short-circuit occurs between the first power supply voltage source and the second power supply voltage source during the operation of the DC-DC converter 400b of FIG. 5, the current comparing unit 460 immediately senses the short-circuit, and stops the output of the first power supply voltage ELVDD and the second power supply voltage ELVSS even when the temperature of the DC-DC converter 400b is less than the reference temperature, thereby more rapidly and effectively preventing ignition and destruction of the DC-DC converter 400b.

Figure 6:
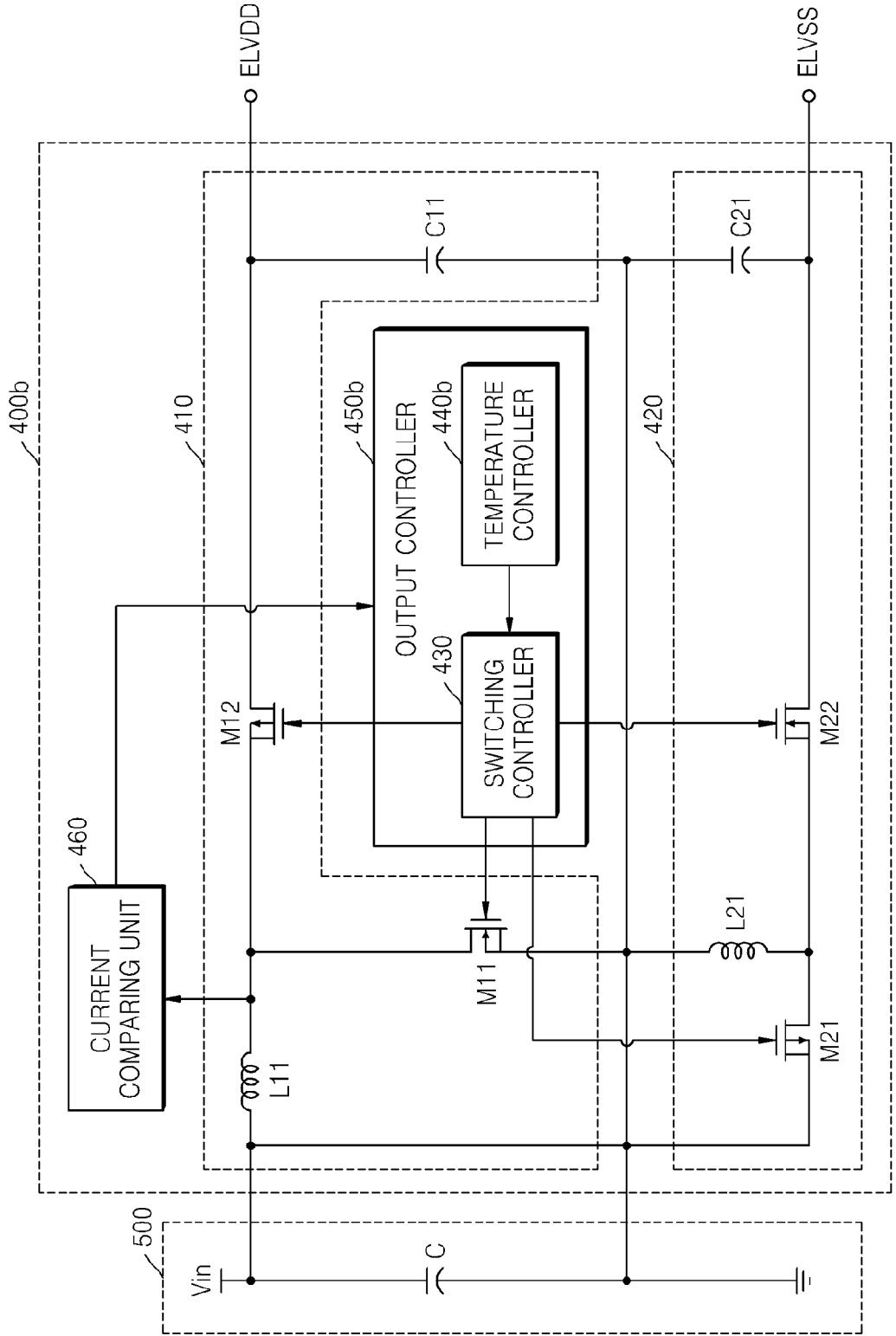
FIG. 6 is a circuit diagram of the DC-DC converter illustrated in FIG. 5.

FIG. 6 is a circuit diagram of the DC-DC converter 400b illustrated in FIG. 5. The circuit diagram of the DC-DC converter 400b illustrated in FIG. 6 is different from the circuit diagram of the DC-DC converter 400a illustrated in FIG. 4 in that the DC-DC converter 400b further includes the current comparing unit 460, and includes the temperature controller 440b for receiving a current detection signal from the current comparing unit 460. The structures and operations of the boost converter 410, the buck-boost converter 420, and the output controller or output control unit 450b are the same as or similar to those described with reference to FIG. 4, and thus a detailed explanation thereof will not be given.

Referring to FIG. 6, the current comparing unit 460 compares an induced current output from the first inductor L11 of the boost converter 410 with an allowable current. The allowable current may be a value determined during manufacturing. The present embodiment is not limited thereto, and the current comparing unit 460 may compare an induced current output from the second inductor L21 of the buck-boost converter 420 with an allowable current.

Figure 7:
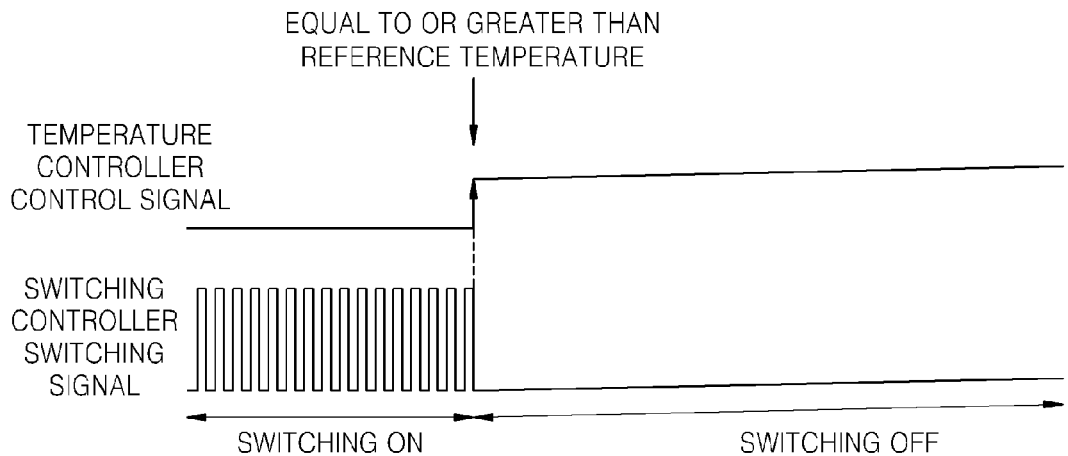
FIG. 7 is a timing diagram for explaining an operation of the DC-DC converter illustrated in FIG. 3.

FIG. 7 is a timing diagram for explaining the operation of the DC-DC converter 400a illustrated in FIG. 3. When the DC-DC converter 400a operates normally, the switching controller 430 alternately applies a high level signal and a low level signal to the boost converter 410 and the buck-boost converter 420. Accordingly, a duty ratio of the switching elements included in the boost converter 410 and the buck-boost converter 420 may be adjusted by using the applied signals.

If a temperature measured by the temperature controller 440a of the DC-DC converter 400a is equal to or greater than a reference temperature, the temperature controller 440a applies a control signal to the switching controller 430.

The switching controller 430 controls output of switching signals applied to the boost converter 410 and the buck-boost converter 420 to be stopped, and controls all of the switching elements included in the boost converter 410 and the buck-boost converter 430 to be turned off. The switching controller 430 maintains a state where the switching elements are turned off until the DC-DC converter 400a is reset.

Figure 8:
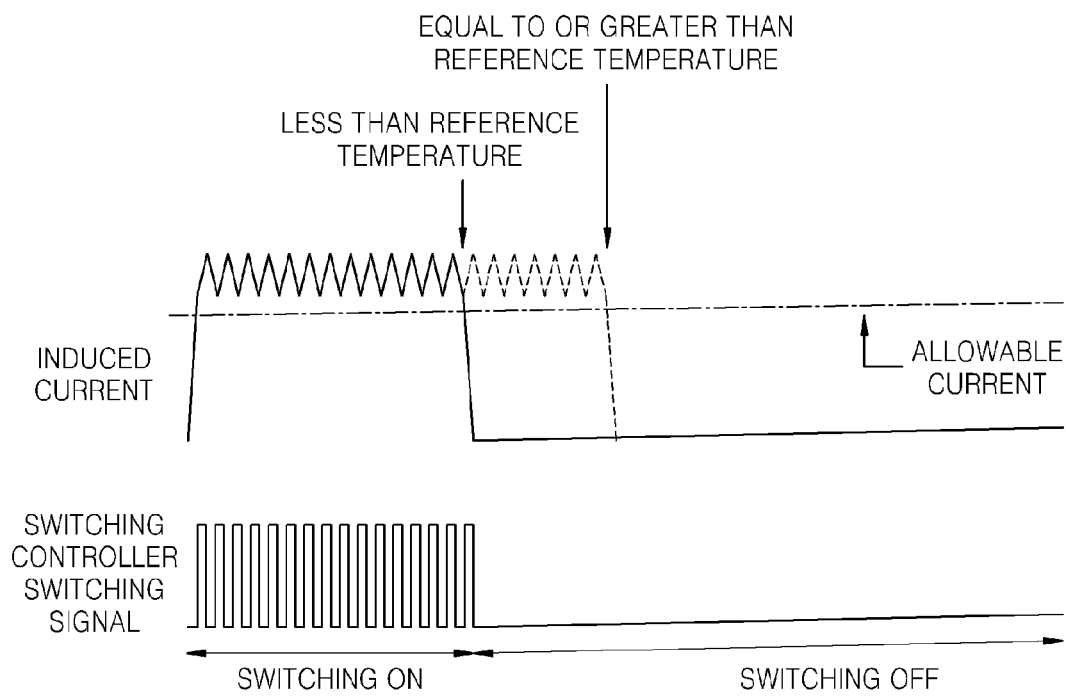
FIG. 8 is a timing diagram for explaining an operation of the DC-DC converter illustrated in FIG. 5.

FIG. 8 is a timing diagram for explaining the operation of the DC-DC converter 400b illustrated in FIG. 5. When the DC-DC converter 400b is normal, the switching controller 430 alternately applies a high level signal and a low level signal to the boost converter 410 and the buck-boost converter 420. Accordingly, a duty ratio with respect to the switching elements included in the boost converter 410 and the buck-boost converter 420 may be adjusted by using the applied signals.

If a short-circuit occurs between the first power supply voltage source and the second power supply voltage source and an induced current is increased to a level above an allowable current, the current comparing unit 460 outputs a current detection signal to the output control unit or output controller 450b.

The switching controller 430 controls output of switching signals applied to the boost converter 410 and the buck-boost converter 420 to be stopped, and controls all of the switching elements included in the boost converter 410 and the buck-boost converter 420 to be turned off. The switching controller 430 maintains a state where the switching elements are turned off until the DC-DC converter 400b is reset.

In this case, even when the temperature of the DC-DC converter 400b is less than a reference temperature, the DC-DC converter 400b may stop output of the first power supply voltage ELVDD and the second power supply voltage ELVSS.

Figure 9:
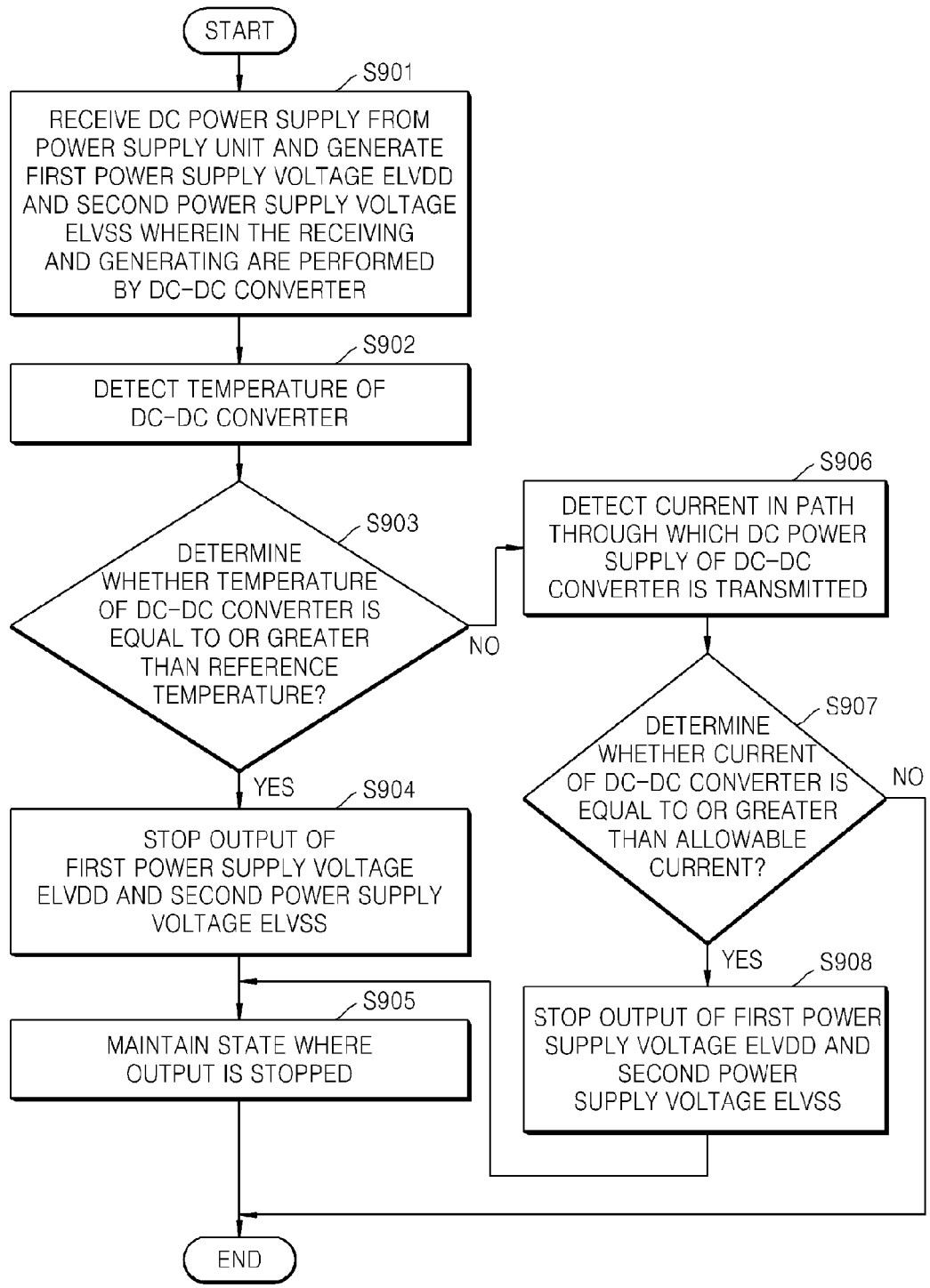
FIG. 9 is a flowchart illustrating a method of driving the organic electroluminescent display device of FIG. 2, according to an embodiment of the present invention.

FIG. 9 is a flowchart illustrating a method of driving the organic electroluminescent display device of FIG. 2, according to an embodiment of the present invention. When the DC-DC converter 400 is normal, the switching controller 430 alternately applies a high level signal and a low level signal to the boost converter 410 and the buck-boost converter 420. Accordingly, a duty ratio of the switching elements included in the boost converter 410 and the buck-boost converter 420 may be adjusted by using the applied signals. In operation S901, the DC-DC converter 400 receives a DC power supply from the power supply unit 500 and generates the first power supply voltage ELVDD and the second power supply voltage ELVSS.

In operation S902, a temperature of the DC-DC converter 400 is detected.

In operation S903, the temperature is compared with a reference temperature. That is, it is determined whether the temperature is equal to or greater than the reference temperature.

If it is determined in operation S903 that the temperature is equal to or greater than the reference temperature, the method proceeds to operation S904. In operation S904, output of the first power supply voltage ELVDD and the second power supply voltage ELVSS is stopped. In detail, the temperature controller 440 applies a signal to the switching controller 430, and the switching controller 430 turns off the first through fourth switching elements M11, M12, M21, and M22 included in the DC-DC converter 400.

In operation S905, the DC-DC converter 400 maintains a state where the output of the first power supply voltage ELVDD and the second power supply voltage ELVSS is stopped until the DC-DC converter 400 is reset.

If it is determined in operation S903 that the temperature of the DC-DC converter is less than the reference temperature, the method proceeds to operation S906. In operation S906, the current comparing unit 460 detects a current in a path through which the DC power supply of the DC-DC converter 400 is transmitted. Here, the current may be an induced current output from a terminal of the inductor.

In operation S907, the current is compared with an allowable current. That is, it is determined whether the current is equal to or greater than the allowable current.

If it is determined in operation S907 that the current is equal to or greater than the allowable current, the method proceeds to operation S908. In operation S908, the output of the first power supply voltage ELVDD and the second power supply voltage ELVSS is stopped. In detail, the current comparing unit 460 applies a current detection signal to the output control unit or output controller 450, and the switching unit 430 turns off the first through fourth switching elements included in the DC-DC converter 400.

In operation S905, the DC-DC converter 400 maintains a state where the output of the first power supply voltage ELVDD and the second power supply voltage ELVSS is stopped until the DC-DC converter 400 is reset.

As described above, when the DC-DC converter is abnormal, since heat generated is detected and the DC-DC converter stops output of the first power supply voltage ELVDD and the second power supply voltage ELVSS, damage to and ignition of the DC-DC converter and the organic electroluminescent display device may be prevented. If a short-circuit occurs between the first power supply voltage source and the second power supply voltage source due to the organic electroluminescent display device being dropped or an impact thereon, since the short-circuit is detected and the DC-DC converter stops output of the first power supply voltage ELVDD and the second power supply voltage ELVSS, damage to the DC-DC converter and the organic electroluminescent display device may be rapidly prevented.

Also, since a state where the output of the first power supply voltage ELVDD and the second power supply voltage ELVSS is stopped is maintained until the DC-DC converter 400 is reset, ignition of the DC-DC converter and explosion or destruction of the organic electroluminescent display device may not occur.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic electroluminescent display device comprising:
    a pixel unit comprising a plurality of scan lines arranged in a row direction, a plurality of data lines arranged in a column direction, and a plurality of pixels formed at intersections between the plurality of scan lines and the plurality of data lines;
    a power supply unit to generate and to output a direct current (DC) power supply from an external power source; and
    a DC-DC converter to receive the DC power supply from the power supply unit, to generate a first power supply voltage and a second power supply voltage, and to supply the first power supply voltage and the second power supply voltage to the pixel unit,
    wherein the DC-DC converter comprises:
        a boost converter to receive the DC power supply from the power supply unit and to generate the first power supply voltage comprising a first capacitor having a first terminal electrically connected to a first power supply voltage output terminal and a second terminal;
        a buck-boost converter to receive the DC power supply from the power supply unit and to generate the second power supply voltage comprising a second capacitor having a first terminal electrically connected to a second power supply voltage output terminal and a second terminal electrically connected to the second terminal of the first capacitor such that the first power supply is coupled to the second power supply through the first and second capacitors; and
        an output control unit to measure a temperature of the DC-DC converter, to compare the temperature of the DC-DC converter with a reference temperature, to stop output of the first power supply voltage of the boost converter and the second power supply voltage of the buck-boost converter if the temperature of the DC-DC converter is equal to or greater than the reference temperature, and to maintain a state where the output of the first and second power supply voltages are stopped.

2. The organic electroluminescent display device of claim 1, wherein the boost converter comprises a first switching element forming an electrical path between a DC power supply source of the power supply unit and a ground voltage source, and a second switching element forming an electrical path between the DC power supply source of the power supply unit and the first power supply voltage output terminal, and
    the buck-boost converter comprises a third switching element forming an electrical path between the DC power supply source of the power supply unit and the ground voltage source and a fourth switching element forming an electrical path between the DC power supply source of the power supply unit and the second power supply voltage output terminal.

3. The organic electroluminescent display device of claim 2, wherein the output control unit comprises a switching controller to control the first switching element through the fourth switching element to be turned on or off.

4. The organic electroluminescent display device of claim 3, wherein the output control unit comprises a temperature controller to measure the temperature of the DC-DC converter, to compare the temperature of the DC-DC converter with a reference temperature, and to output a signal to the switching controller if the temperature of the DC-DC converter is equal to or greater than the reference temperature.

5. The organic electroluminescent display device of claim 2, wherein the boost converter or the buck-boost converter further comprises an inductor to transmit the DC power supply of the power supply unit to the first power supply voltage output terminal or the second power supply voltage output terminal.

6. The organic electroluminescent display device of claim 1, wherein the output control unit maintains the state where the output of the first power supply voltage and the second power supply voltage is stopped until the DC-DC converter is reset.

7. The organic electroluminescent display device of claim 5, further comprising a current comparing unit to compare an induced current output from the inductor with an allowable current, and to output a current detection signal to the output control unit if the induced current is equal to or greater than an allowable current,
    wherein the output control unit stops the output of the first power supply voltage and the second power supply voltage according to the current detection signal.

8. The organic electroluminescent display device of claim 7, wherein the output control unit maintains the state where the output of the first power supply voltage and the second power supply voltage is stopped until the DC-DC converter is reset.

9. A DC-DC converter comprising:
    a boost converter to receive a DC power supply from a power supply unit and to generate a first power supply voltage comprising a first capacitor having a first terminal electrically connected to a first power supply voltage output terminal and a second terminal;
    a buck-boost converter to receive the DC power supply from the power supply unit and to generate a second power supply voltage comprising a second capacitor having a first terminal electrically connected to a second power supply voltage output terminal and a second terminal electrically connected to the second terminal of the first capacitor such that the first power supply is coupled to the second power supply through the first and second capacitors; and
    an output control unit to measure a temperature of the DC-DC converter, to compare the temperature with a reference temperature, to stop output of the first power supply voltage of the boost converter and the second power supply voltage of the buck-boost converter if the temperature is equal to or greater than the reference temperature, and to maintain a state where the output of the first and second power supply voltage is stopped.

10. The DC-DC converter of claim 9, wherein the boost converter comprises a first switching element for forming an electrical path between a DC power supply source of the power supply unit and a ground voltage source and a second switching element for forming an electrical path between the DC power supply source of the power supply unit and the first power supply voltage output terminal, and the buck-boost converter comprises a third switching element for forming an electrical path between the DC power supply source of the power supply unit and the ground voltage source and a fourth switching unit for forming an electrical path between the DC power supply source of the power supply unit and the second power supply voltage output terminal.

11. The DC-DC converter of claim 10, wherein the output control unit comprises a switching controller to control the first switching element through the fourth switching unit to be turned on or off.

12. The DC-DC converter of claim 11, wherein the output control unit comprises a temperature controller to measure a temperature of the DC-DC converter, to compare the temperature of the DC-DC converter with a reference temperature, and to output a signal to the switching controller if the temperature of the DC-DC converter is equal to or greater than the reference temperature.

13. The DC-DC converter of claim 10, wherein the output control unit maintains the state where the output of the first power supply voltage and the second power supply voltage is stopped until the DC-DC converter is reset.

14. The DC-DC converter of claim 10, wherein the boost converter or the buck-boost converter further comprises an inductor to transmit the DC power supply of the power supply unit to the first power supply voltage output terminal or the second power supply voltage output terminal.

15. The DC-DC converter of claim 14, further comprising a current comparing unit to compare an induced current output from the inductor with an allowable current and to output a current detection signal to the output control unit if the induced current is equal to or greater than the allowable current,
wherein the output control unit stops the output of the first power supply voltage and the second power supply voltage according to the current detection signal.

16. The DC-DC converter of claim 15, wherein the output control unit maintains the state where the output of the first power supply voltage and the second power supply voltage is stopped until the DC-DC converter is reset.

17. A method of driving an organic electroluminescent display device comprising a power supply unit for generating a DC power supply from an external power source and supplying the DC power supply to a DC-DC converter and the DC-DC converter for converting the DC power supply into a first power supply voltage and a second power supply voltage and supplying the first power supply voltage and the second power supply voltage to a plurality of pixels, the method comprising:
receiving the DC power supply from the power supply unit and generating the first power supply voltage utilizing a boost converter and the second power supply voltage utilizing a buck-boost converter;
detecting a temperature of the DC-DC converter;
comparing the temperature with a reference temperature;
stopping output of the first power supply voltage and the second power supply voltage if the temperature is equal to or greater than the reference temperature; and
maintaining a state where the output of the first power supply voltage and the second power supply voltage is stopped until the DC-DC converter is reset,
wherein: the boost converter comprises a first capacitor having a first terminal electrically connected to a first power supply voltage output terminal and a second terminal, and
the buck-boost converter comprises a second capacitor having a first terminal electrically connected to the second power supply voltage output terminal and a second terminal electrically connected to the second terminal of the first capacitor such that the first power supply is coupled to the second power supply through the first and second capacitors.

18. The method of claim 17, further comprising:
detecting a current in a path through which the DC power supply of the DC-DC converter is transmitted;
comparing the current with an allowable current;
outputting a current detection signal if the current is equal to or greater than the allowable current; and
stopping the output of the first power supply voltage and the second power supply voltage according to the current detection signal.

* * * * *